(12) United States Patent
Hamada

(10) Patent No.: US 7,520,254 B2
(45) Date of Patent: Apr. 21, 2009

(54) CONTROL APPARATUS AND A CONTROL METHOD THEREOF

(75) Inventor: Takashi Hamada, Kariya (JP)

(73) Assignees: Toyota Jidosha Kabushiki Kaisha, Toyota (JP); Denso Corporation, Kariya (JP)

( * ) Notice: Subject to any disclaimer, the term of this patent is extended or adjusted under 35 U.S.C. 154(b) by 0 days.

(21) Appl. No.: 11/601,726

(22) Filed: Nov. 20, 2006

(65) Prior Publication Data

US 2007/0137629 A1    Jun. 21, 2007

(30) Foreign Application Priority Data

Dec. 15, 2005    (JP)    ............................. 2005-361738

(51) Int. Cl.
*F01L 1/34* (2006.01)
(52) U.S. Cl. ............... 123/90.15; 123/90.16; 123/90.17
(58) Field of Classification Search .............. 123/90.16, 123/90.17, 90.31, 90.15
See application file for complete search history.

(56) References Cited

U.S. PATENT DOCUMENTS 6,561,150 B1 * 5/2003 Kikuoka et al. .......... 123/90.18
2004/0206317 A1    10/2004 Song et al.

FOREIGN PATENT DOCUMENTS

JP    A 2001-263015    9/2001
JP    A 2002-303187    10/2002

* cited by examiner

*Primary Examiner*—Zelalem Eshete
(74) *Attorney, Agent, or Firm*—Oliff & Berridge, PLC

(57) ABSTRACT

A control apparatus for an internal combustion engine including a plurality of cylinders and a changing mechanism the changes a timing at which an intake valve provided for each of the cylinders closes, comprising: a control portion that controls the changing mechanism so that the intake valve closes at a timing within a predetermined range from a bottom dead center; and a detection portion that detects at least one of an air-fuel ratio of each of the cylinders and a value corresponding to the air-fuel ratio when the changing mechanism is controlled so that the intake valve closes at the timing within the predetermined range from the bottom dead center.

4 Claims, 6 Drawing Sheets

CONTROL APPARATUS AND A CONTROL METHOD THEREOF

INCORPORATION BY REFERENCE

The disclosure of Japanese Patent Application No. 2005-361738 filed on Dec. 15, 2005 including the specification, drawings and abstract is incorporated herein by reference in its entirety.

BACKGROUND OF THE INVENTION

1. Field of the Invention

The invention relates to a control apparatus for an internal combustion engine and a control method thereof, and more particularly, to a control apparatus for an internal combustion engine that includes a plurality of cylinders and a changing mechanism that can change the timing for closing intake valves provided for each of the cylinders, and a control method thereof.

2. Description of the Related Art

In an engine that includes a plurality of cylinders, it is known that the air-fuel ratio may differ among the cylinders due to the variation of operational characteristics (valve duration, phase, etc) of the intake valves among the cylinders, and so on. When the air-fuel ratio differs among the cylinders, the fluctuation of output torque becomes large because the burning conditions of air-fuel mixture consisting of air and fuel differ. In this case, the fluctuation of rotation of the crankshaft (fluctuation in the rotation speed while the crankshaft makes one turn) becomes large, so the vibration and noise of the engine become large. Therefore, it is desirable to reduce such variation of air-fuel ratio.

Japanese Patent Application Publication No. JP-A-2002-303187 discloses a control apparatus for a multi-cylinder internal combustion engine (a multi-cylinder engine) that suppresses the variation of air-fuel ratio and torque among the cylinders. This control apparatus calculates the air-fuel ratio of exhaust gas (exhaust gas air-fuel ratio) of the cylinder for which the valve duration of intake valves is set to maximum, and based on the calculated air-fuel ratio, reduces the variation of fuel injection amount among the cylinders.

According to the control apparatus for the multi-cylinder internal combustion engine disclosed in the publication, the reduction of the variation of fuel injection amount among the cylinders is performed based on the air-fuel ratio of the exhaust gas which is calculated when the amount of intake air is not controlled using the valve duration of the intake valves, i.e., when the same amount of intake air is sucked into each cylinder. That is, the amount of fuel to be injected into each cylinder is corrected such that all the cylinders have the same exhaust gas air-fuel ratio. This makes it possible to suppress the variation of fuel injection amount among the cylinders. Thus, the variation of air-fuel ratio and torque among the cylinders can be suppressed.

However, as in the case of the control apparatus for the multi-cylinder internal combustion engine disclosed in Japanese Patent Application Publication No. JP-A-2002-303187, if the air-fuel ratio is calculated when the maximum valve duration of the intake valves is set, such valve duration may affect the air-fuel ratio. For example, when the intake valves of a certain cylinder close later because of their characteristic that the actual valve duration tends to be larger than set in the control, a larger amount of air is pushed back to the intake ports as the piston goes up. As a result, the amount of intake air in the cylinder decreases, making the air-fuel ratio lower. Meanwhile, when the intake valves of other cylinder close earlier because of their characteristic that the actual valve duration tends to be smaller than set in the control are provided, a smaller amount of air is pushed back to the intake ports as the piston goes up, and as a result, the amount of intake air in the cylinder increases, making the air-fuel ratio higher. In order to calculate the air-fuel ratio without being affected by the variation of operational characteristics (e.g., valve duration) of the intake valves for each of the cylinders, further improvement is still needed.

It is an object of the invention to provide a control apparatus for an internal combustion engine, which can obtain an air-fuel ratio that is not affected by the operational characteristics of the intake valves or a value corresponding to such an air-fuel ratio.

SUMMARY OF THE INVENTION

A control apparatus for an internal combustion engine according to a first aspect of the invention controls the internal combustion engine that includes a plurality of cylinders and a changing mechanism that changes a timing at which intake valves provided for each of the cylinders close. The control apparatus includes control means for controlling the changing mechanism so that the intake valves close at a timing within a predetermined range from a bottom dead center, and detection means for detecting at least one of an air-fuel ratio of each of the cylinders and a value corresponding to the air-fuel ratio when the changing mechanism is controlled so that the intake valves close at the timing within the predetermined range from the bottom dead center.

According to the first embodiment, the changing mechanism is controlled so that the intake valves close at the timing within the predetermined range from the bottom dead center. When the intake valves close around the bottom dead center, intake air in the cylinder in which the actual timing for closing the intake valves comes later than the timing set in the control is pushed back to the intake ports as the piston goes up. Therefore, the amount of air sucked into the cylinder decreases compared to when the actual timing for closing the intake valves coincides with the timing set in the control. On the other hand, the intake valves of the cylinder in which the actual timing for closing the intake valves comes earlier than the timing set in the control close before the piston reaches the bottom dead center. Therefore, the amount of air sucked into the cylinder is smaller than when the actual timing for closing the intake valves coincides with the control timing. As such, in either of the above cases, the air amount tends to decrease, and the difference in the amount of air, which is caused by the variation of operational characteristics among the intake valves provided for each of the cylinders, is small. When the changing mechanism is controlled so as to close the intake valves within the predetermined range from the bottom dead center, at least one of the air fuel ratio of each of the cylinders or the value corresponding to the air-fuel ratio is detected. This makes it possible to provide a control apparatus for an internal combustion engine, which can obtain an air-fuel ratio that is not affected by the operational characteristics of the intake valves and a value corresponding to such an air-fuel ratio.

The control apparatus for the internal combustion engine according to a second aspect of the invention further includes means for controlling the changing mechanism so that the intake valves close at a timing outside the predetermined range from the bottom dead center; means for detecting at least one of the air-fuel ratio of each of the cylinders and the value corresponding to the air-fuel ratio when the changing mechanism is controlled so that the intake valves close at the timing outside the predetermined range from the bottom dead center; and means for calculating a difference between the value detected when the changing mechanism is controlled so that the intake values close at the timing within the predetermined range from the bottom dead center and the value detected when the changing mechanism is controlled so that the intake valves close at the timing outside the predetermined range from the bottom dead center.

According to the second aspect, the changing mechanism is controlled so as to close each of the intake valves at the timing outside the predetermined range from the bottom dead center. When the intake valves are controlled to close at a timing behind the predetermined range from the bottom dead center, the amount of air that is pushed back from the cylinder to the intake ports as the piston goes up increases in the cylinder in which the actual timing for closing the intake valves comes later than the timing set in the control. In this case, therefore, the amount of air sucked into the cylinder is smaller than when the actual timing for closing the intake valves coincides with the timing set in the control. On the other hand, in the cylinder in which the actual timing for closing the intake valves comes earlier than the timing set in the control, the amount of air pushed back from the cylinder to the intake ports as the piston goes up decreases. In this case, the amount of air sucked into the cylinder is therefore larger than when the actual timing for closing the intake valves coincides with the timing set n the control. When the intake valves are controlled to close at the timing advanced from the predetermined range from the bottom dead center, a larger amount of air is sucked into the cylinder as the piston goes down in the cylinder in which the actual timing for closing the intake valves comes later than the timing set in the control. Therefore, the amount of air sucked into the cylinder is larger than to when the actual timing for closing the intake valves coincides with the timing set in the control. In the cylinder in which the actual timing for closing the intake valves comes earlier than the timing set in the control, the intake valves close earlier. Thus, the amount of air sucked into the cylinder is smaller than when the actual timing for closing the intake valves coincides with the timing set in the control. Accordingly, in either of the above cases, the difference in the amount of air, which is caused by the variation of operational characteristics among the intake valves provided for each of the cylinders, becomes large. Based on this, when the changing mechanism is controlled so as to close the intake valves outside the predetermined range from the bottom dead center, the variation of air-fuel ratio detected at the respective cylinders or the variation of a value corresponding to the air-fuel ratio is caused by both of the operational characteristics of the intake valves and factors other than the operational characteristics. Meanwhile, the variation of air-fuel ratio when the intake valves are controlled to close at the timing within the predetermined range from the bottom dead center is caused only by the factors other than the operational characteristics of the intake valves. Therefore, it is considered that the difference between the value detected when the changing mechanism is controlled so as to close the intake valves at the timing within the predetermined range from the bottom dead center and the value detected when the changing mechanism is controlled so as to close the intake valves at the timing outside the predetermined range from the bottom dead center does not reflect the influence of the factors other than the operational characteristics of the intake valves. Therefore, the difference between the value detected when the changing mechanism is controlled so as to close the intake valves at the timing within the predetermined range from the bottom dead center and the value detected when the changing mechanism is controlled so as to close the intake valves outside the predetermined range from the bottom dead center is calculated, and by using the calculated difference, the variation of operational characteristics among the intake valves, that is, the difference in the amount of air sucked to the cylinders, is accurately determined.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF THE PREFERRED EMBODIMENTS

Figure 1:
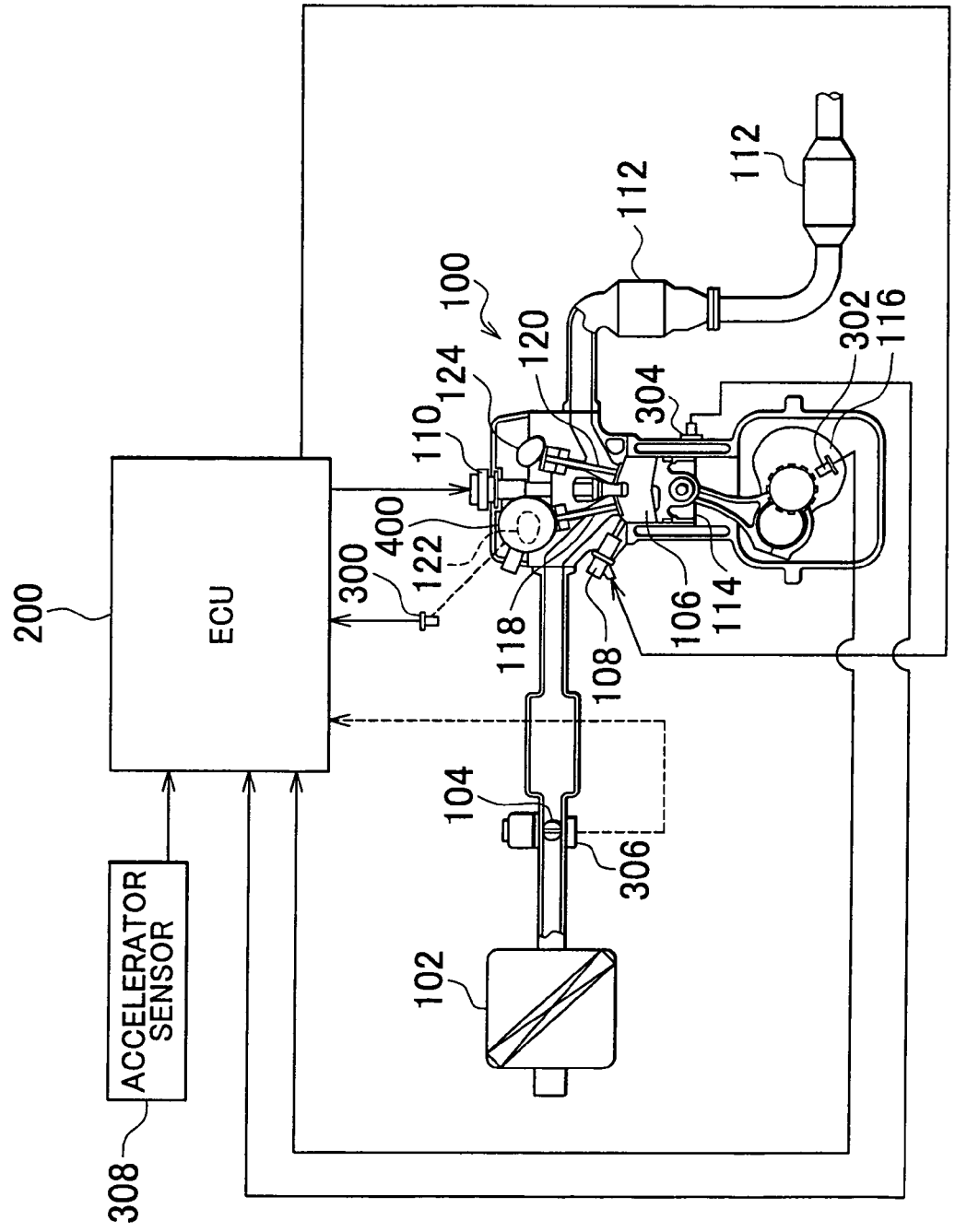
FIG. 1 is a view schematically showing the engine of the vehicle to which the control apparatus according to the first embodiment of the invention is applied.

Preferred embodiments of the invention will be described with reference to the drawings. In the descriptions below, the same components in the drawings are denoted by the same reference numerals. The names and functions of the same components are also the same. Therefore, the detailed descriptions thereof will not be repeated.

With reference to FIG. 1, an engine of a vehicle that is equipped with a control apparatus according to an embodiment of the invention will be described. The control apparatus is realized by, for example, a program executed by an electric control unit (ECU) 200 as shown in FIG. 1.

Air is sucked from an air cleaner 102 to an engine 100. The amount of intake air is adjusted by a throttle valve 104. The throttle valve 104 is an electric throttle valve that is driven by a motor.

Air is mixed with fuel in a cylinder 106 (combustion chamber). In the embodiment, a plurality of the cylinders 106 are provided. Fuel is directly injected from a corresponding injector 108 to each of the cylinders 106. That is, an injection nozzle of the injector 108 is provided inside the cylinder 106. Fuel is injected from an air intake side (a side from which air is introduced) within the cylinder 106.

Fuel is injected during an intake stroke. However, it should be noted that the timing of fuel injection is not limited to during the intake stroke. In the embodiment, the engine 100 is described as a direct-injection type engine in which the injection nozzle of the injector 108 is provided inside the cylinder 106. However, in addition to the injectors 108 for direct injection, injectors for port injection may be provided, or only the injectors for port injection may be provided.

Air-fuel mixture in the cylinder 106 is fired by an ignition plug 110 and then burns. The air-fuel mixture after combustion, that is, exhaust gas, is purified by three-way catalysts 112 and then discharged to outside the vehicle. Combustion of the air-fuel mixture pushes a piston 114 downward, whereby a crankshaft 116 rotates.

Intake valves 118 and exhaust valves 120 are provided on top of each of the cylinders 106. The intake valves 118 control the amount of air sucked into each of the cylinders 106 and the timing of the air suction. The exhaust valves 120 control the amount of air discharged from the cylinder 106 and the timing of the discharge. The intake valves 118 are driven by a cam 122, and the exhaust valves 120 are driven by a cam 124.

The lift and valve duration of the intake valves 118 are controlled by a variable valve lift (VVL) mechanism 400. The lift and valve duration of the exhaust valves 120 may be controlled as well as the intake valves 118. Further, instead of or in addition to the VVL mechanism 400, a variable valve timing (VVT) mechanism may be provided so as to control the opening and closing timing of the intake valves 118.

The ECU 200 controls the degree of throttle opening, the ignition timing, the fuel injection timing, the operational state of the intake valves (including the lift and valve duration), etc., so as to realize the desired operational state of the engine 100. Signals from a cam angle sensor 300, a crank angle sensor 302, a knock sensor 304, a throttle opening sensor 306, and an accelerator sensor 308 are input to the ECU 200.

The cam angle sensor 300 outputs a signal indicating the positions of the cams. The crank angle sensor 302 outputs a signal indicating the rotation speed of the crankshaft 116 (engine speed) and the rotation angle of the crankshaft 116. The knock sensor 304 outputs a signal indicating the intensity of vibration of the engine 100. The throttle opening sensor 306 outputs a signal indicating the degree of the throttle opening. The accelerator sensor 308 outputs a signal indicating the operation amount of an accelerator pedal (depression amount of the accelerator pedal).

The ECU 200 controls the engine 100 based on the signals input from the above sensors while using a map and a program stored in a memory (not shown).

Figure 2:
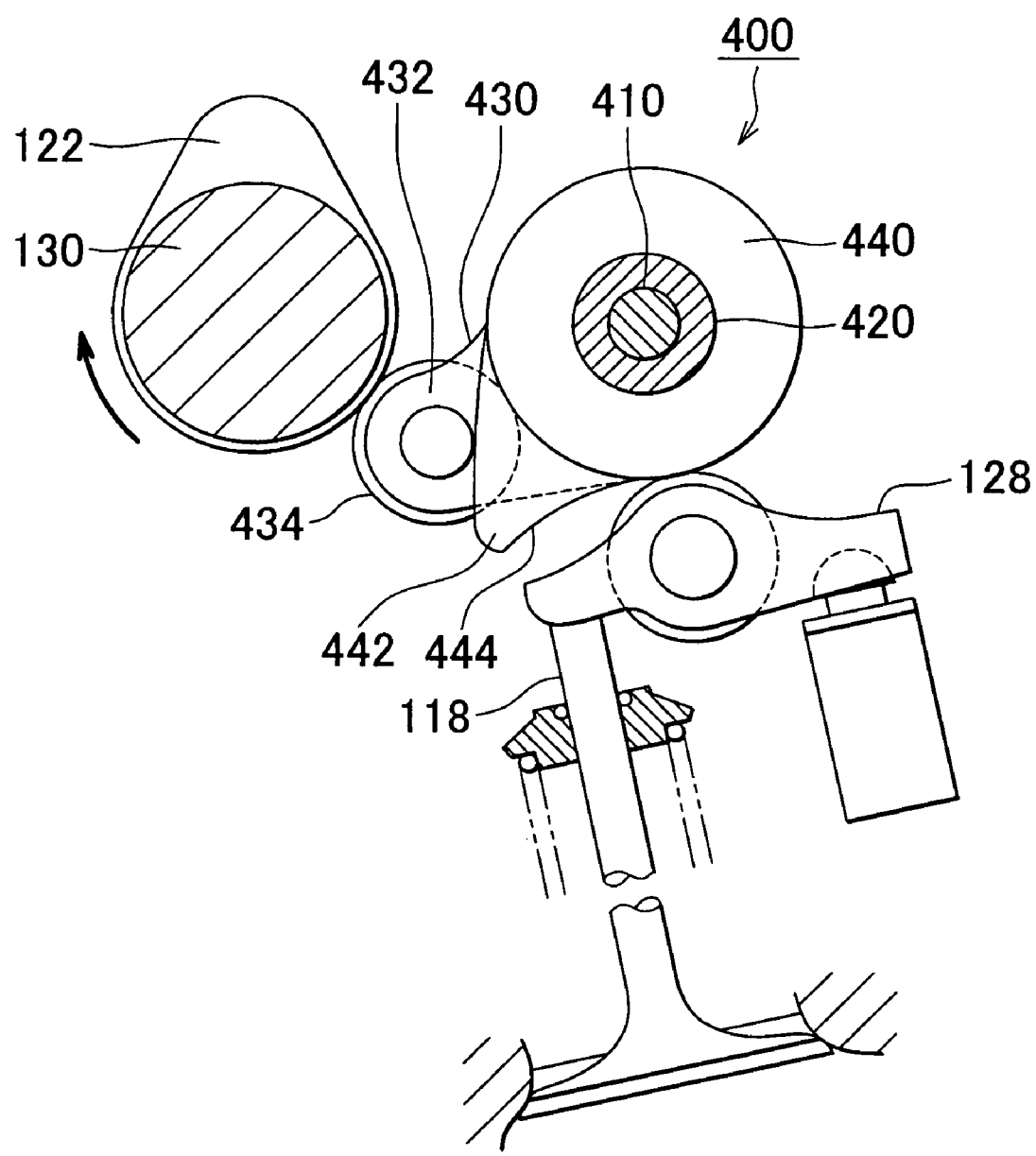
FIG. 2 is a front view of the VVL mechanism.

With reference to FIG. 2, the VVL mechanism 400 that controls the lift and the valve duration of the intake valves 118 will be described in further detail. The VVL mechanism 400 includes a drive shaft 410, a support pipe 420, input arms 430, and rocker cams 440. The drive shaft 410 extends in one direction, and the support pipe 420 covers an outer peripheral surface of the drive shaft 410. The input arms 430 and the rocker cams 440 are arranged in line on the outer peripheral surface of the support pipe 420 along the axial direction of the drive shaft 410. An actuator that moves the drive shaft 410 axially is connected to one end of the drive shaft 410.

In the VVL mechanism 400, each input shaft 430 corresponds to each cam 122 that is provided for each of the cylinders 106. Two rocker cams 440 are provided at both sides of the input arm 430 to correspond to a pair of the intake valves 118 provided at each of the cylinders 106.

The support pipe 420 is shaped like a hollow cylinder and arranged in parallel to a camshaft 130. The support pipe 420 is firmly fixed to a cylinder head so that the support pipe 420 does not move in the axial direction nor rotate.

The drive shaft 410 is inserted into the support pipe 420 so that the drive shaft can slide in the axial direction of the support pipe 420. The input arm 430 and the two rocker cams 440 are arranged on an outer peripheral surface of the support pipe 420 such that they can rock about the axial center of the drive shaft 410 but can not move in the axial direction of the support pipe 420.

The input arm 430 includes arm portions 432 and a roller portion 434. The arm portions 432 protrude from the outer peripheral surface of the support pipe 420, and the roller portion 434 is rotatably connected to the ends of the arm portions 432. The input arm 430 is arranged such that the roller portion 434 is located at the position where the roller portion 434 abuts the cam 122.

Each of the rocker cams 440 includes a nose portion 442 which is substantially triangle shape and protrudes from the outer peripheral surface of the support pipe 420. A cam surface 444 which is concavely curved is formed on one side of the nose portion 442 (lower side as viewed in the FIG. 1). A roller is rotatably attached to a rocker arm 128, and is pressed against the cam surface 444 by an urging force of a valve spring provided for each of the intake valves 118.

The input arm 430 and the rocker cams 440 rock together about the axial center of the drive shaft 410. Therefore, as the camshaft 130 rotates, the input arm 430 which is in abutment with the cam 122 rocks, and the rocker cams 440 also rock due to the rocking of the input arm 430. The motion of the rocker cams 440 is transmitted to the intake valves 118 though the rocker arm 128, so as to open and close the intake valves 118.

The VVL mechanism 400 further includes a mechanism that changes the relative phase difference between the input arm 430 and the rocker cams 440 around the axial center of the support pipe 420. The mechanism, by changing the relative phase difference, suitably changes the lift and the valve duration of the intake valves 118.

In other words, when the relative phase difference of the input arm 430 and the rocker cams 440 is expanded, the rock angle of the rocker arm 128 relative to the rock angle of the input arm 430 and the rocker cams 440 is accordingly expanded. As a result, the lift and the valve duration of the intake valves 118 increase.

Further, when the relative phase difference is reduced, the rock angle of the rocker arm 128 relative to the rock angle of the input arm 430 and the rocker cams 440 is accordingly reduced. As a result, the lift and the valve duration of the intake valves 118 decrease.

Figure 3:
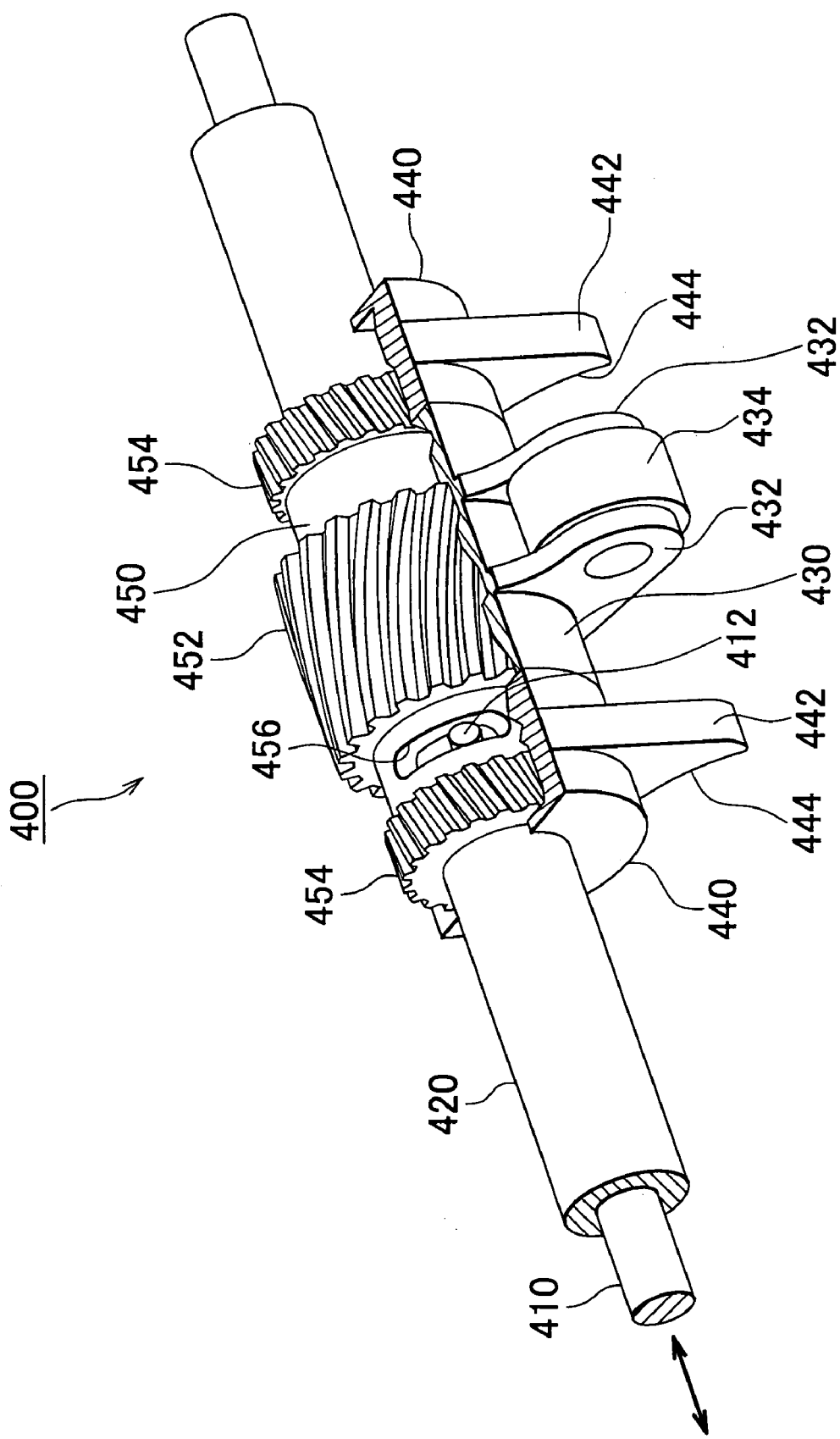
FIG. 3 is a perspective view of the VVL mechanism.

With reference to FIG. 3, the VVL mechanism 400 will be described in further detail. FIG. 3 is a perspective view partially showing the VVL mechanism shown in FIG. 2. In FIG. 3, a part of the structure is shown in a cutaway view in order to expressly show the internal structure.

A slider gear assy 450 is housed in a space defined by the input arm 430, the two rocker cams 440, and the outer peripheral surface of the support pipe 420. The slider gear assy 450 is rotatably and slidably supported on the support pipe 420. The slider gear assy 450 is arranged so as to slide on the support pipe 420 in its axial direction.

The slider gear assy 450 includes a helical gear 452 that is provided at the center in the axial direction. A right-handed helical spline is formed on the helical gear 452. The slider gear assy 450 also includes helical gears 454 that are provided at both sides of the helical gear 452. A left-handed spline is formed on each of the helical gears 454, as opposed to the spline formed on the helical gear 452.

Helical splines that correspond to the helical gear 452 and the helical gears 454 are respectively formed on the inner peripheral surfaces of the input arm 430 and the two rocker cams 440 that define the space in which the slider gear assy 450 is housed. Specifically, a right-handed helical spline is formed on the inner peripheral surface of the input arm 430 and is meshed with the helical gear 452. Likewise, left-handed helical splines are formed on the inner peripheral surfaces of the rocker cams 440 and are meshed with the helical gears 454, respectively.

An oblong hole 456 extending in the circumferential direction is formed in the slider gear assy 450 between one of the helical gears 454 and the helical gear 452. Further, an oblong hole 458 (not shown) extending in the axial direction is provided in the support pipe 420 so as to overlap a part of the oblong hole 456. A lock pin 412 is integrally provided on the drive shaft 410 that is inserted into the support pipe 420. The locking pin 412 protrudes through the overlapped portions of the two oblong holes 456, 458.

As the drive shaft 410 moves in the axial direction, the slider gear assy 450 is pushed by the locking pin 412, and the helical gears 452 and 454 simultaneously move in the axial direction of the drive shaft 410. Contrary to such movement of the helical gears 452 and 454, since the input arm 430 and the rocker cams 440 that are engaged with the helical gears 452 and 454 via the splines can not move in the axial direction, they rotate about the axial center of the drive shaft 410 though the meshing between the helical splines.

As mentioned above, the direction of the helical spline of the input arm 430 is opposite to that of the helical splines of the rocker cams 440. Therefore, the input arm 430 and the rocker cams 440 rotate in opposite directions, changing the relative phase difference between the input arm 430 and the rocker cams 440, and thus the lift and the valve duration of the intake valves 118 as previously described. It should be noted, however, that the VVL mechanism 400 is not limited to this structure.

Figure 4:
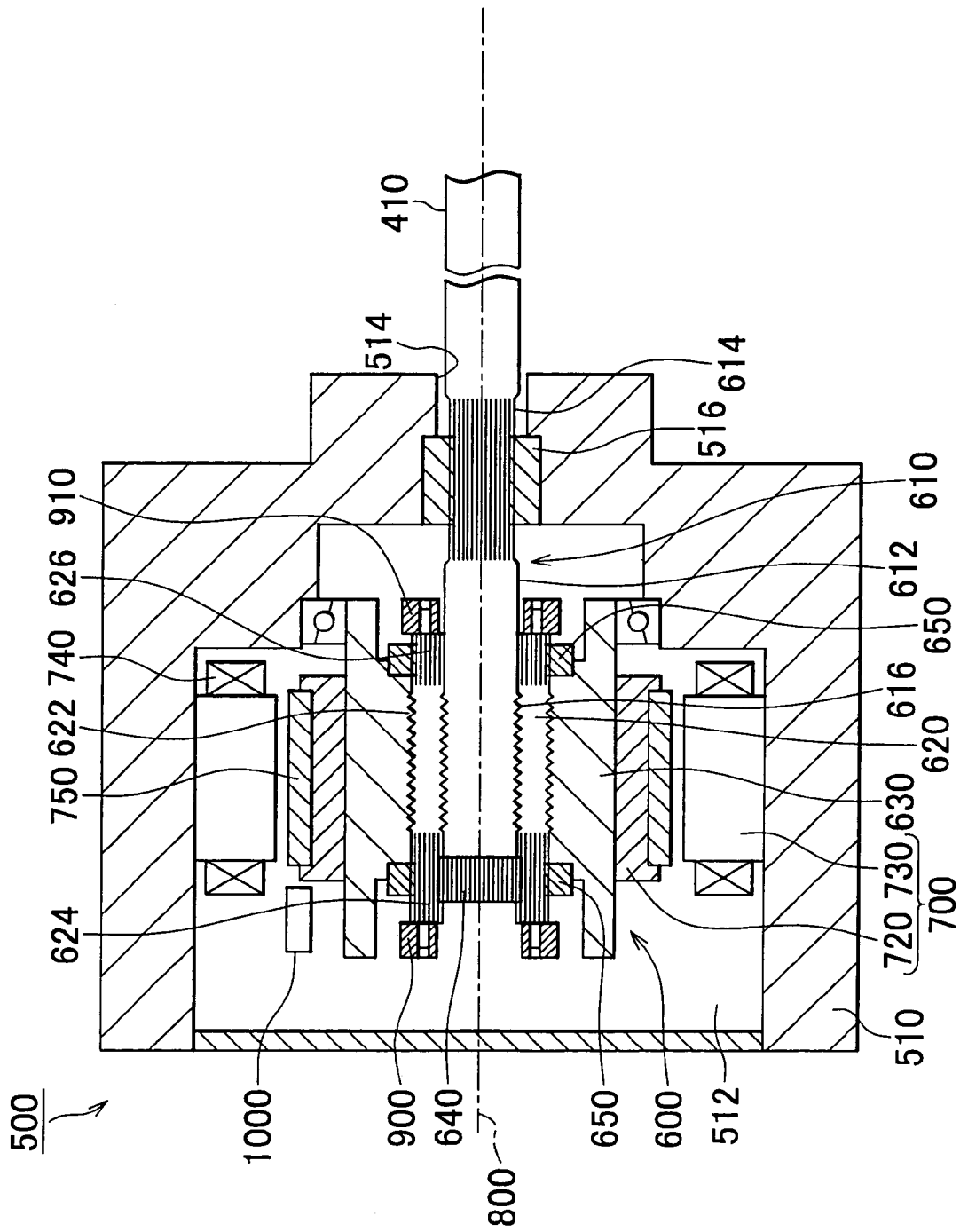
FIG. 4 is a cross-sectional view showing the actuator of the VVL mechanism.

With reference to FIG. 4, an actuator 500 that moves the drive shaft 410 of the VVL mechanism 400 linearly in the axial direction will be described. The actuator 500 includes a housing 510, a differential roller gear 600, and a motor 700. The housing 510 defines a space 512, and the differential roller gear 600 is provided in the space 512 and converts rotary motion into linear motion. The motor 700 inputs rotary motion to the differential roller gear 600. An opening 514 is formed in the housing 510, which opens toward the cylinder head on which the VVL mechanism 400 is provided.

The differential roller gear 600 includes a sun shaft 610 that extends along an axis 800, a plurality of planetary shafts 620, and a nut 630. The planetary shafts 620 extend in parallel to the axis 800 on an outer peripheral surface 612 of the sun shaft 610 and arranged with respect to each other in the circumferential direction around the axis 800. The nut 630 is a cylindrical member which extends coaxially with the axis 800 so as to surround the planetary shafts 620.

The sun shaft 610 is arranged in series with the drive shaft 410 along the axis 800. The sun shaft 610 protrudes toward the outside of the housing 510 from the space 512 through the opening 514. The sun shaft 610 is connected to the drive shaft 410 by means of, for example, a coupling (not shown).

The sun shaft 610 includes a spline portion 614 on which a spline is formed and a thread portion 616 on which a male thread is formed. A ring-shaped sun gear 640 is fit to the end of the sun shaft 610 in the space 512. Formed on the outer peripheral surface of the sun gear 640 is a spur gear with gear teeth arranged in the circumferential direction around the axis 800.

An anti-rotation collar 516 is fixed at the location surrounding the spline portion 614. A spline is formed on an inner peripheral surface of the anti-rotation collar 516. The anti-rotation collar 516 and the spline portion 614 are meshed with each other, thereby restricting the rotary motion of the sun shaft 610 around the axis 800.

Retainers 900 and 910 that annularly extend with respect to the axis 800 are provided at both sides of the planetary shafts 620 so as to rotatably support the ends of each planetary shaft 620. The retainers 900 and 910 are provided at certain intervals in the circumferential direction around the axis 800 and are connected to each other by poles that extend in parallel to the planetary shafts 620.

Each of the planetary shafts 620 includes a thread portion 622 and gear portions 624 and 626 formed at both sides of the thread portion 622, respectively.

Formed on the thread portion 622 of each planetary shaft 620 is a male thread that is engaged with a male thread formed on the thread portion 616 of the sun shaft 610 and a female thread formed on the inner peripheral surface of the nut 630. The male thread formed on the thread portion 622 of the planetary shaft 620 is threaded in the opposite direction to that in which the male thread of the thread portion 616 of the sun shaft 610 is threaded, but in the same direction as that in which the female thread of the inner peripheral surface of the nut 630 is threaded.

A spur gear is formed on the gear portion 624 of each planetary shaft 620. The spur gear is meshed with the spur gear formed on the outer peripheral surface of the sun gear 640 and the spur gear formed on the inner peripheral surface of one of ring gears 650, which will be described later. Similarly, a spur gear is formed on the gear portion 626 of the planetary shaft 620, and is meshed with the spur gear formed on the other ring gear 650.

The nut 630 is supported by a bearing fixed to the housing 510 so as to be rotatable about the axis 800. The female thread is formed on the inner peripheral surface of the nut 630. The female thread is threaded in the opposite direction to that in which the male thread of the thread portion 616 of the sun shaft 610 is threaded.

The ring gears 650 are located and fixed at both sides of the inner peripheral surface of the nut 630 on which the female thread is formed. A spur gear, which has teeth arranged in the circumferential direction with respect to the axis 800, is formed on the inner peripheral surface of each of the ring gears 650.

The male thread formed on the thread portion 616 of the sun shaft 610, the male thread formed on the thread portion 622 of the planetary shaft 620, and the female thread formed on the inner peripheral surface of the nut 630 are all multiple threads having the same thread pitch. The pitch circle diameters of the male threads of the sun shaft 610 and the planetary shaft 620 and the female thread of the nut 630 are denoted as Ds, Dp, and Dn, respectively, and their numbers of starts are denoted as Ns, Np, and Nn, respectively. In the embodiment, the sun shaft 610 moves in the direction of the axis 800, and therefore, the number of starts of each of the threads is determined, for example, so as to satisfy the relation of Ns: Np: Nn=(Ds+1): Dp: Dn. It should be noted that the pitch circle diameter and the number of starts of each of the threads may have other relationship than described herein.

The motor 700 includes a rotor 720 and a stator 730. The rotor 720 is fixed to the outer peripheral surface of the nut 630 by shrink-fitting, press-fitting, adhesive-bonding, etc. The stator 730 around which a coil 740 is wound is fixed to the housing 510 in the same manner.

The stator 730 annularly extends with respect to the axis 800 so as to surround the rotor 720. The rotor 720 is positioned so as to create a predetermined size of space between the rotor 720 and the stator 730 along the circumferential direction around the axis 800. Permanent magnets 750 are provided in the portion of the rotor 720 that faces the stator 730 across the space, and arranged at every predetermined angle with respect to the axis 800. A magnetic field is produced between the rotor 720 and the stator 730 by supplying power to the coil 740, which makes the rotor 720 and the nut 630 to rotate about the axis 800.

As the nut 630 rotates, the rotary motion of the nut 630 is transmitted to the planetary shafts 620 through the meshing between the threads formed on the nut 630 and the planetary shafts 620. At this time, the spur gears formed on the gear portions 624 of the planetary shafts 620 are in mesh with the spur gears formed on the outer peripheral surface of the sun gear 640 and the corresponding ring gear 650, and the spur gears formed on the gear portions 626 of the planetary shafts 620 are in mesh with the spur gear formed on the inner peripheral surface of the other ring gear 650.

Therefore, each planetary shaft 620 remains stationary in the direction of the axis 800 and revolves around the axis 800 while rotating. Also, since the planetary shafts 620 are meshed with the spur gears, they are kept parallel to the axis 800.

The rotary motion of the planetary shafts 620 is transmitted to the sun shaft 610 though the meshing between the threads formed on the planetary shafts 620 and the sun shaft 610. The rotary motion of the sun shaft 610 is restricted by the anti-rotation collar 516, and therefore the sun shaft 610 can move only in the direction of the axis 800. Thus, the drive shaft 410 linearly moves, so that the lift and the valve duration of the intake valves 118 are changed as described above.

The operation amount (rotation speed or rotation angle) of the motor 700 (the rotor 720) is detected by a sensor 1000. A signal indicating the detection result is sent to the ECU 200. In the embodiment, the ECU 200 indirectly detects the lift and the valve duration of the intake valves 118 based on the operation amount of the motor 700 using a map in which the operation amount of the motor 700 is specifically associated with the lift and the valve duration of the intake valves 118.

Figure 5:
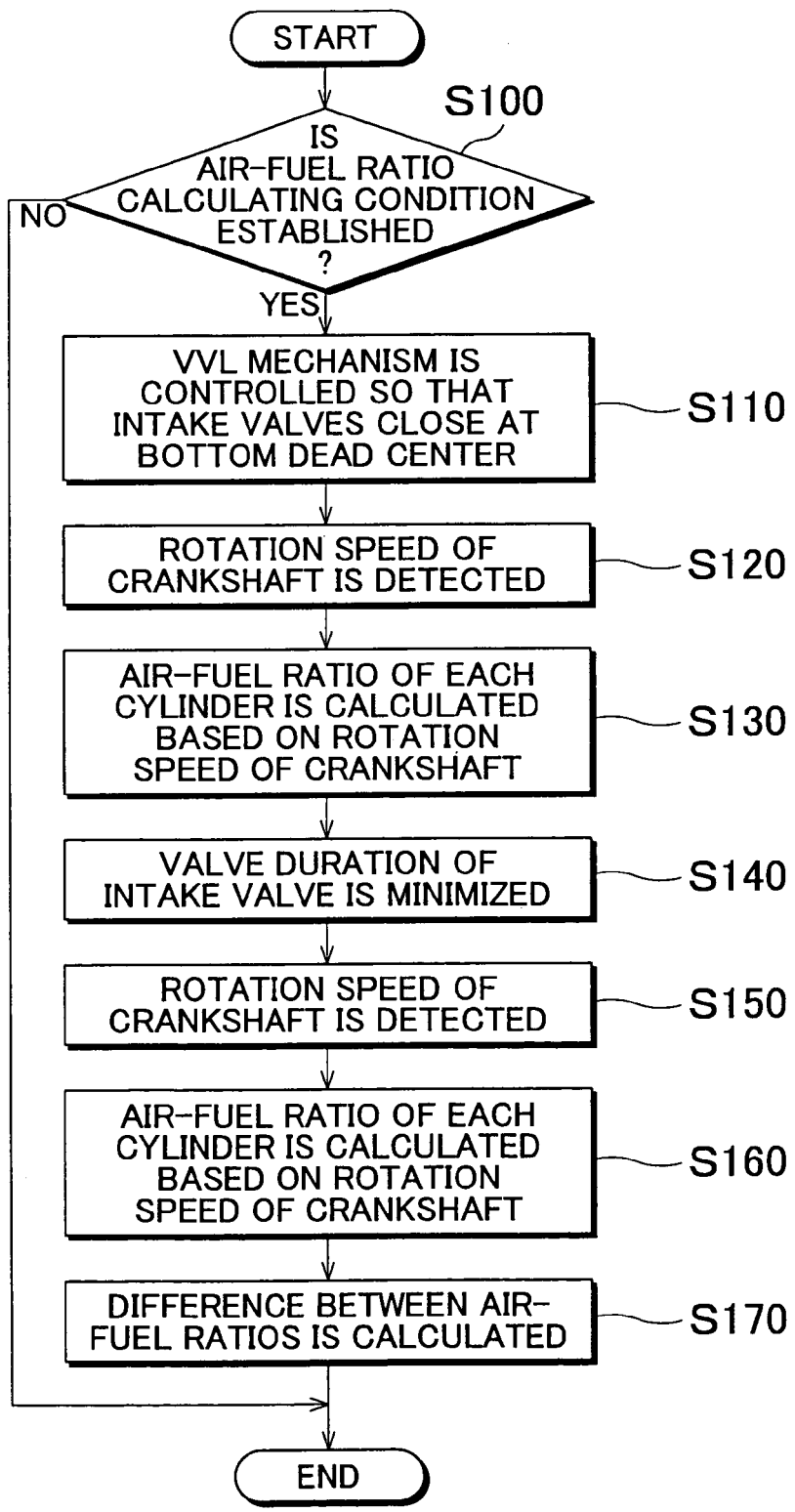
FIG. 5 is a flowchart showing the control structure of the program executed by the ECU, which corresponds to the control apparatus according to the embodiment of the invention.

With reference to FIG. 5, the control by a program executed by the ECU 200, which is the control apparatus in the embodiment of the invention, will be described.

In step (hereinafter abbreviated as "S") 100, the ECU 200 determines whether an air-fuel ratio calculating condition for each of the cylinders 106 is established. For example, after start-up of the engine 100, if the engine 100 is in the idling state where the valve duration (lift) of the intake valves 118 is temporarily increased to warm up the catalysts 112 and is then returned to the normal value, it is determined that the air-fuel ratio calculating condition is established. When the air-fuel ratio calculating condition is established (YES in S100), the process goes on to S110. If not (NO in S100), the process is terminated.

In S110, the ECU 200 controls the motor 700 so that the intake valves 118 close at the bottom dead center. That is, the ECU 200 controls the motor 700 so as to set a valve duration with which the intake valves 118 close at the bottom dead center.

In S120, the ECU 200 detects the rotation speed of the crankshaft 116 based on the signal sent from the crank angle sensor 302. The rotation speed of the crankshaft 116 is detected from the crank angle.

In S130, the ECU 200 calculates (detects) the air-fuel ratio of each of the cylinders 106 based on the rotation speed of the crankshaft 116 at the crank angle corresponding to an expansion stroke of each of the cylinders 106. That is, the air-fuel ratio of each of the cylinders 106 is indirectly detected using the rotation speed of the crankshaft 116. The air-fuel ratio of each of the cylinders 106 is calculated by adding or subtracting the value according to the rotation speed of the crankshaft 116 to/from the stoichiometric air-fuel ratio. The relationship between the rotation speed of the crankshaft 116 and the value that is added to or subtracted from the stoichiometric air-fuel ratio is predetermined by an experiment or a simulation, and stored in a memory (not shown) of the ECU 200.

In S140, the ECU 200 controls the motor 700 so as to minimize the valve duration of the intake valves 118. Note that the valve duration set in this step is not limited to the minimized duration, but may be other duration, such as the maximum duration, as long as the intake valves 18 are closed at a timing different from the bottom dead center.

In S150, the ECU 200 detects the rotation speed of the crankshaft 116 based on the signal sent from the crank angle sensor 302. The rotation speed of the crankshaft 116 is detected from the crank angle.

In S160, the ECU 200 calculates (detects) the air-fuel ratio of each of the cylinders 106 based on the rotation speed of the crankshaft 116 at the crank angle corresponding to the expansion stroke of each of the cylinders 106.

In S170, the ECU 200 calculates the difference between the air-fuel ratio calculated when the intake valves 118 are controlled to close at the bottom dead center and the air-fuel ratio calculated when the valve duration is minimized (when the intake valves 118 are controlled to close at a timing different from the bottom dead center).

The control algorithm employed in the program executed by the ECU 200 of the embodiment having the aforementioned structure and its control flow will hereinafter be described.

In the engine 100 having the multiple cylinders 106, the amount of air sucked into each of the cylinders 106 may become uneven due to the variation of operational characteristics among the intake valves 118, and as a result, the air-fuel ratio may also become uneven.

In this case, it is desirable that the air fuel ratio of each of the cylinders 106 be detected and the amount of fuel injected to each of the cylinders 106 be corrected so as to make the air-fuel ratio equal among the cylinders. However, the air-fuel ratio of each of the cylinders 106 is affected by fuel itself that is injected from the injector 108 provided in each of the cylinders 106. In addition, when an ignition failure of the ignition plug 110 provided in each of the cylinders 106 occurs, the air-fuel ratio (air-fuel ratio detected by the sensors and the like) may vary.

Therefore, in order to accurately detect such variation of air-fuel ratio due to the variation of operational characteristics (valve duration) among the intake valves 118, it is necessary to temporarily detect the variation of air-fuel ratio caused by factors other than the operational characteristics of the intake valves 118.

The influence of the operational characteristics of the intake valves 118 on the air-fuel ratio will now be described. In the cylinder 106 in which the actual valve duration of the intake valves 118 tends to be larger than a valve duration set in the control, when the valve duration of the intake valves 118 is controlled so as to be smaller than A (1) shown by a chain line in FIG. 6, the air-fuel ratio becomes leaner than it is when the actual valve duration equals the valve duration set in the control. That is, since the actual valve duration is larger than the valve duration set in the control, the timing at which the intake valves 118 actually close comes later than the timing set in the control. As a result, a larger amount of air is sucked into the corresponding cylinder 106, which makes the air-fuel ratio leaner.

On the other hand, when the valve duration of the intake valves 118 is controlled to be larger than A(1) and the fuel is injected during a compression stroke, the air-fuel ratio becomes richer than it is when the actual valve duration equals the valve duration set in the control. That is, since the actual valve duration is larger than the valve duration set in the control, the timing at which the intake valves 118 actually close comes later than the timing set in the control. As a result, the air sucked into the corresponding cylinder 106 is pushed back into the intake ports as the piston 114 goes up, and therefore the amount of air in the cylinder 106 decreases, which makes the air-fuel ratio richer.

Figure 6:
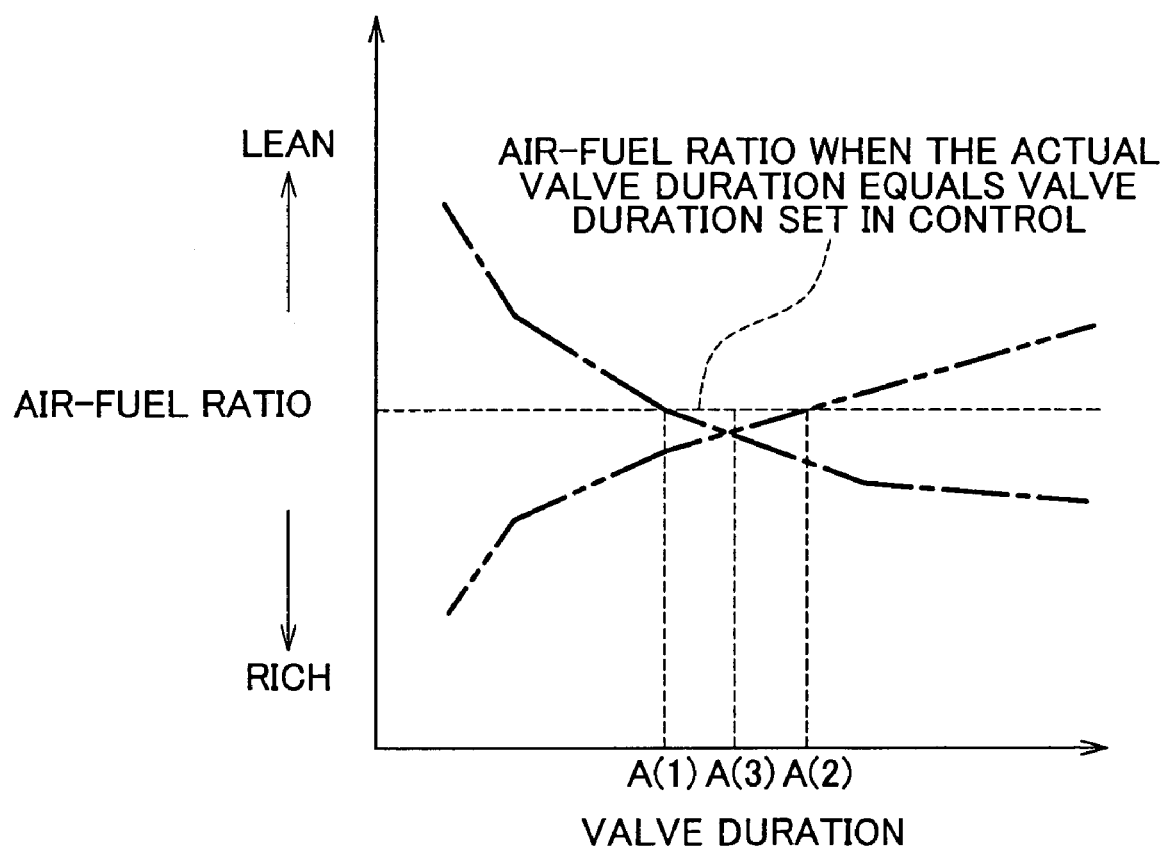
FIG. 6 is a graph showing the relationship between the air-fuel ratio and the valve duration.

Meanwhile, in the cylinder 106 in which the actual valve duration of the intake valves 118 tends to be smaller than a valve duration set in the control, when the valve duration of the intake valves 118 is controlled so as to be smaller than A(2) shown by a two-dotted line in FIG. 6, the air-fuel ratio becomes richer than it is when the actual valve duration equals the valve duration set in the control. That is, since the actual valve duration is smaller than the valve duration set in the control, the timing at which the intake valves 118 actually close comes earlier than the timing set in the control. As a result, the amount of air sucked into the corresponding cylinder 106 decreases, which makes the air-fuel ratio richer.

On the other hand, when the valve duration of the intake valves 118 is controlled to be larger than A(2) and fuel is injected during a compression stroke, the air-fuel ratio becomes leaner than it is when the actual valve duration equals the valve duration set in the control. That is, since the actual valve duration is smaller than the valve duration set in the control, the timing at which the intake valves 118 actually close comes earlier than the timing set in the control. As a result, the amount of air pushed back to the intake ports as the piston 114 goes up decreases, so that the amount of air in the cylinder 106 increases. This makes the air-fuel ratio leaner.

Because of such relationship, in both of the cylinder 106 in which the actual valve duration tends to be larger than set in the control and the cylinder 106 in which the actual valve duration tends to be smaller than set in the control, the air-fuel ratio tends to be rich with the valve duration A(3) where the intake valves 118 are controlled to close at the bottom dead center. Therefore, the air-fuel ratio detected under this condition is not significantly affected by the variation of air amount due to the variation of operational characteristics (valve duration) among the intake valves 118.

Then, when the air-fuel ratio calculating condition is established (YES in S100), the valve duration of the intake valves 118 is set to the valve duration A(3) where the intake valves 118 are controlled to close at the bottom dead center. Then, the rotation speed of the crankshaft 116 is detected (S120), and the air-fuel ratio of each of the cylinders 106 is calculated based on the rotation speed of the crankshaft 116 at the crank angle corresponding to the expansion stroke of each of the cylinders 106 (S130).

In this way, an air-fuel ratio that is not significantly affected by the variation of operational characteristics among the intake valves 118 can be obtained. In other words, an air-fuel ratio that varies only by factors other than the operational characteristics of the intake valves 118 can be obtained.

Then, the valve duration of the intake valves 118 is minimized (S140). Further, the rotation speed of the crankshaft 116 is detected (S150), and the air-fuel ratio of each cylinder is calculated based on the rotation speed of the crankshaft 116 (S160). The difference between this calculated air-fuel ratio and the air-fuel ratio obtained with the valve duration A(3) where the intake valves 118 close at the bottom dead center is calculated (S170).

As described above, the variation of the air-fuel ratio obtained with the valve duration A(3) where the intake valves 118 each close at the bottom dead center is caused only by factors other than the operational characteristics of the intake valves 118. On the other hand, the variation of the air-fuel ratio obtained with the minimized valve duration is caused by the operational characteristics of the intake valves 118 as well as the other factors.

Thus, it is considered that the difference between the air-fuel ratio variations present under the above different conditions does not reflect the influence of the factors other than the variation of operational characteristics among the intake valves 118. That is, the difference between the air-fuel ratio obtained with the minimized valve duration of the intake valves 118 and the air-fuel ratio obtained with the valve duration A(3) where the intake valves 118 close at the bottom dead center varies due to the variation of operational characteristics among the intake valves 118 only. In this way, the variation of operational characteristics among the intake valves 118, that is, the variation of air-fuel ratio due to different valve durations, can be accurately detected.

As described above, the ECU, which is the control apparatus in the embodiment of the invention, calculates the air-fuel ratio of each cylinder based on the rotation speed of the crankshaft detected when the intake valves are controlled to close at the bottom dead center. Thus, the ECU obtains the air-fuel ratio which is not significantly affected by the variation of operational characteristics among the intake valves. Therefore, the variation of air-fuel ratio due to factors other than the variation of operational characteristics among the intake valves can be accurately detected.

In the embodiment of the invention, the intake valves 118 are controlled to close at the bottom dead center. Alternatively, the intake valves 118 may be controlled to close at a point within a predetermined range from the bottom dead center, provided that the variation of operational characteristics among the intake valves do not significantly affect the air-fuel ratio.

While in the embodiment the air-fuel ratio calculated from the rotation speed of the crankshaft 116 was used, other value, such as the rotation speed of the crankshaft 116 and the output torque or other parameters obtained from the rotation speed, may alternatively be used, provided that it corresponds to the air-fuel ratio of each cylinder.

While the invention has been described with reference to exemplary embodiments thereof, it is to be understood that the invention is not limited to the exemplary embodiments or constructions. To the contrary, the invention is intended to cover various modifications and equivalent arrangements other than described above. In addition, while the various elements of the exemplary embodiments are shown in various combinations and configurations, which are exemplary, other combinations and configurations, including more, less or only a single element, are also within the spirit and scope of the invention.

What is claimed is:

1. A control apparatus for an internal combustion engine including a plurality of cylinders and a changing mechanism that changes a timing at which an intake valve provided for each of the cylinders closes, comprising:
    a control portion that controls the changing mechanism so that the intake valve closes at a timing within a predetermined range from a bottom dead center;
    a detection portion that detects a first value which is at least one of an air-fuel ratio of each of the cylinders individually and a value corresponding to the air-fuel ratio of each of the cylinders individually when the changing mechanism is controlled so that the intake valve closes at the timing within the predetermined range from the bottom dead center;
    a first unit that controls the changing mechanism so that the intake valve closes at a timing outside the predetermined range from the bottom dead center;
    a second unit that detects a second value which is at least one of an air-fuel ratio of each of the cylinders individually and a value corresponding to the air-fuel ratio of each of the cylinders individually when the changing mechanism is controlled so that the intake valve closes at the timing outside the predetermined range from the bottom dead center; and a third unit that calculates a difference between the first value that is detected by the detection portion when the changing mechanism is controlled so that the intake valve closes at the timing within the predetermined range from the bottom dead center and the second value that is detected by the second unit when the changing mechanism is controlled so that the intake valve closes at the timing outside the predetermined range from the bottom dead center.

2. The control apparatus for the internal combustion engine according to claim 1, wherein the control portion controls the changing mechanism so that the intake valve closes at the bottom dead center.

3. The control apparatus for the internal combustion engine according to claim 1, wherein the first unit controls the changing mechanism so as to minimize a valve duration of the intake valve.

4. A control method for an internal combustion engine including a plurality of cylinders and a changing mechanism that changes a timing at which an intake valve provided for each of the cylinders closes, comprising:

controlling the changing mechanism so that the intake valve closes at a timing within a predetermined range from a bottom dead center;

detecting a first value which is at least one of an air-fuel ratio of each of the cylinders individually and a value corresponding to the air-fuel ratio of each of the cylinders individually when the changing mechanism is controlled so that the intake valve closes at the timing within the predetermined range from the bottom dead center;

controlling the changing mechanism so that the intake valve closes at a timing outside the predetermined range from the bottom dead center;

detecting a second value which is at least one of an air-fuel ratio of each of the cylinders individually and a value corresponding to the air-fuel ratio of each of the cylinders individually when the changing mechanism is controlled so that the intake valve closes at the timing outside the predetermined range from the bottom dead center; and calculating a difference between the first value detected when the changing mechanism is controlled so that the intake valve closes at the timing within the predetermined range from the bottom dead center and the second value detected when the changing mechanism is controlled so that the intake valve closes at the timing outside the predetermined range from the bottom dead center.

* * * * *